US012593236B2

(12) United States Patent　　　(10) Patent No.:　US 12,593,236 B2

Lu et al.　　　(45) Date of Patent:　Mar. 31, 2026

(54) INTELLIGENT ADAPTIVE MEASUREMENT GAPS FOR LOW MOBILITY USER EQUIPMENT (UEs)

(71) Applicant: T-Mobile USA, Inc., Bellevue, WA (US)

(72) Inventors: Kun Lu, Bellevue, WA (US); Jun Liu, Sammamish, WA (US); Egil Gronstad, Encinitas, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 346 days.

(21) Appl. No.: 18/497,739

(22) Filed: Oct. 30, 2023

(65) Prior Publication Data

US 2025/0142384 A1　May 1, 2025

(51) Int. Cl.
H04W 24/10 (2009.01)
H04W 76/20 (2018.01)

(52) U.S. Cl.
CPC ........... H04W 24/10 (2013.01); H04W 76/20 (2018.02)

(58) Field of Classification Search
CPC .. H04W 24/10; H04W 76/20; H04W 36/0088
See application file for complete search history.

(56) References Cited

U.S. PATENT DOCUMENTS

2013/0331098 A1　12/2013　Balasubramaniyan et al.
2014/0022974 A1　1/2014　Eriksson et al.

2021/0400589 A1　12/2021　Yiu et al.
2022/0369265 A1　11/2022　He et al.
2024/0187901 A1*　6/2024　Cui ........................ H04W 24/10
2024/0430762 A1*　12/2024　Hsieh ................ H04W 36/0088
2025/0133434 A1*　4/2025　Tayyab ................. H04W 72/51
2025/0203397 A1*　6/2025　Hsieh .................... H04W 24/02

FOREIGN PATENT DOCUMENTS

WO　　　2021159291 A1　8/2021

OTHER PUBLICATIONS

"International Search Report and Written Opinion", received in International Application No. PCT /US2024/059065 mailed on Apr. 7, 2025, 13 pages.

(Continued)

*Primary Examiner* — Hashim S Bhatti

(74) *Attorney, Agent, or Firm* — Foley IP Law, PLLC

(57) ABSTRACT

Solutions are disclosed that provide intelligent adaptive measurement gaps for low mobility user equipment (UEs), such as home internet access points. Because low mobility (stationary use) UE do not move, or move only infrequently, the frequency for of handovers to neighboring cells is reduced, lowering the urgency of measuring signal reception from neighboring cells. A wireless network determines that a first UE is associated with a stationary use, and that a second UE is not. The network transmits a first radio resource control (RRC) message specifying a measurement gap repetition period (MGRP) and an indication to skip at least one measurement gap, to the first UE, and transmits a second RRC message specifying the MGRP, without an indication to skip a measurement gap, to the second UE. In some examples, the MGRP is indicated as having one of four values: 20 milliseconds (ms), 40 ms, 80 ms, and 160 ms.

13 Claims, 7 Drawing Sheets

(56)                    References Cited

OTHER PUBLICATIONS

Patrick Merias et al, "Moderator Summary#1—Study on XR Specific Capacity Improvements", 3GPP Draft; R1-2212606; vol. RAN WG1, No. Toulouse, Nov. 15, 2022, 66 pages.
Intel Corporation, "UE power consumption reduction in RRM measurements", 3GPP Draft; R1-1810797, vol. RAN WG1, No. Chengdu, China; Sep. 29, 2018, 3 pages.
International Search Report and Written Opinion issued in PCT Application No. PCT/US2024/053133 Mailed Date: Jan. 29, 2025, 14 pages.

* cited by examiner

Figures 2A, 2B, 2C:
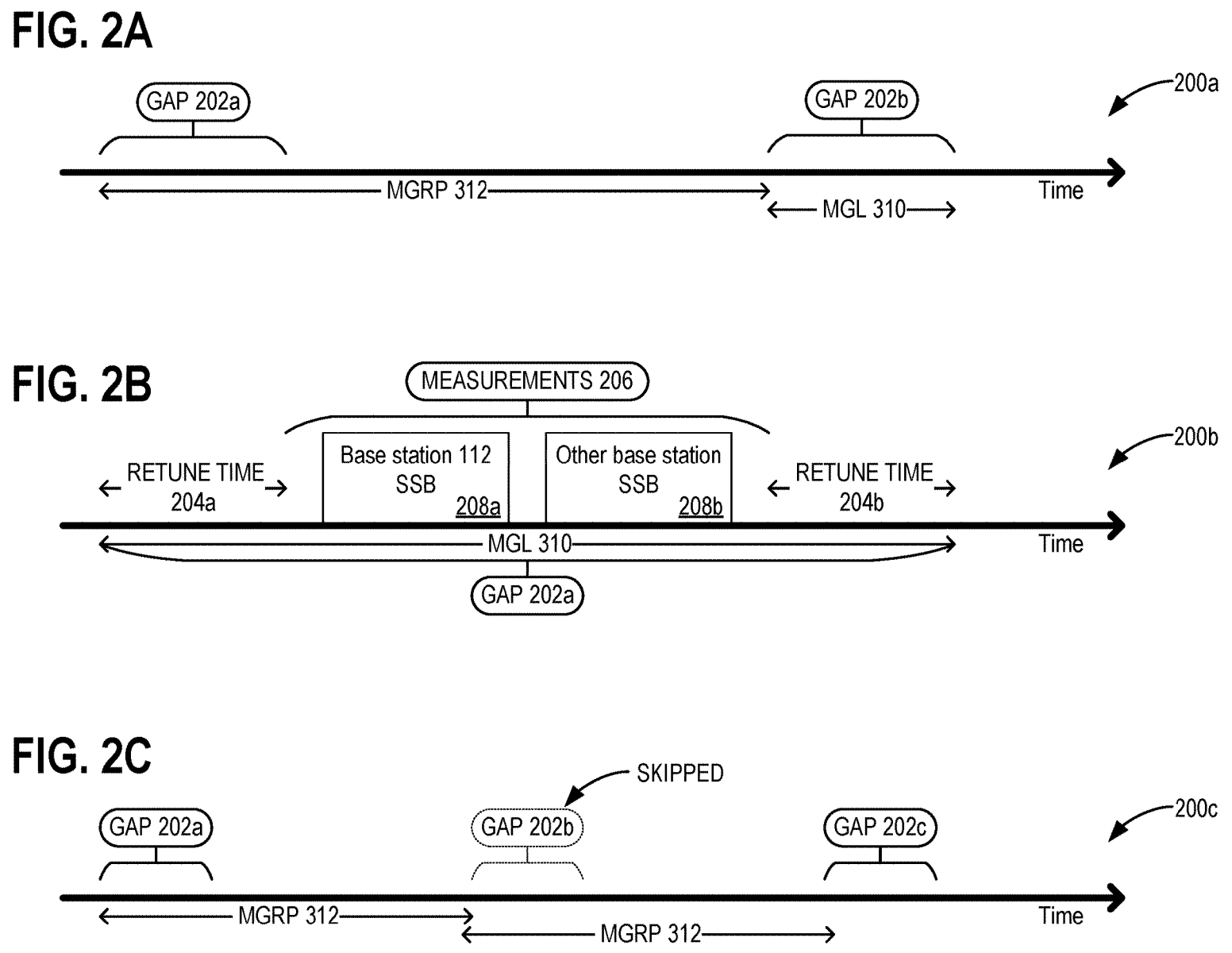

GAP 202a

GAP 202b

MGRP 312

MGL 310

Time

RETUNE TIME 204a

MEASUREMENTS 206

Base station 112 SSB 208a

Other base station SSB 208b

RETUNE TIME 204b

MGL 310

GAP 202a

Time

GAP 202a

SKIPPED

GAP 202b

GAP 202c

MGRP 312

MGRP 312

Time

```
RRCReconfiguration ::= SEQUENCE {
 rrc-TransactionIdentifier RRC-TransactionIdentifier,
 criticalExtensions CHOICE {
  rrcReconfiguration RRCReconfiguration-IEs,
  criticalExtensionsFuture SEQUENCE {}
 }
}

RRCReconfiguration-IEs ::= SEQUENCE {
 radioBearerConfig RadioBearerConfig
 secondaryCellGroup OCTET STRING (CONTAINING CellGroupConfig)
 measConfig MeasConfig          ← 302
 lateNonCriticalExtension OCTET STRING OPTIONAL,
 nonCriticalExtension SEQUENCE { } OPTIONAL
}
```

302a —

```
MeasConfig ::= SEQUENCE {
 measObjectToRemoveList MeasObjectToRemoveList
 measObjectToAddModList MeasObjectToAddModList
 reportConfigToRemoveList ReportConfigToRemoveList
 reportConfigToAddModList ReportConfigToAddModList
 measIdToRemoveList MeasIdToRemoveList
 measIdToAddModList MeasIdToAddModList
 s-MeasureConfig CHOICE {
  ssb-RSRP RSRP-Range,
  csi-RSRP RSRP-Range
 }
 quantityConfig QuantityConfig
 measGapConfig MeasGapConfig
 measGapSharingConfig MeasGapSharingConfig
 ...
}
```

302 —    302b

304a —    304

```
MeasGapConfig ::= SEQUENCE {
 gapFR1 SetupRelease {GapConfig }
 ...
}
```

304 —    304b    306

```
GapConfig ::= SEQUENCE {
 gapOffset INTEGER (0..159),
 mgl ENUMERATED {ms1dot5, ms3, ms3dot5, ms4, ms5dot5, ms6},
 mgrp ENUMERATED {ms20, ms40, ms80, ms160},
 mgta ENUMERATED {ms0, ms0dot25, ms0dot5},
 gapSkip INTEGER (0..N),
 ...
}
```

Figure 4:
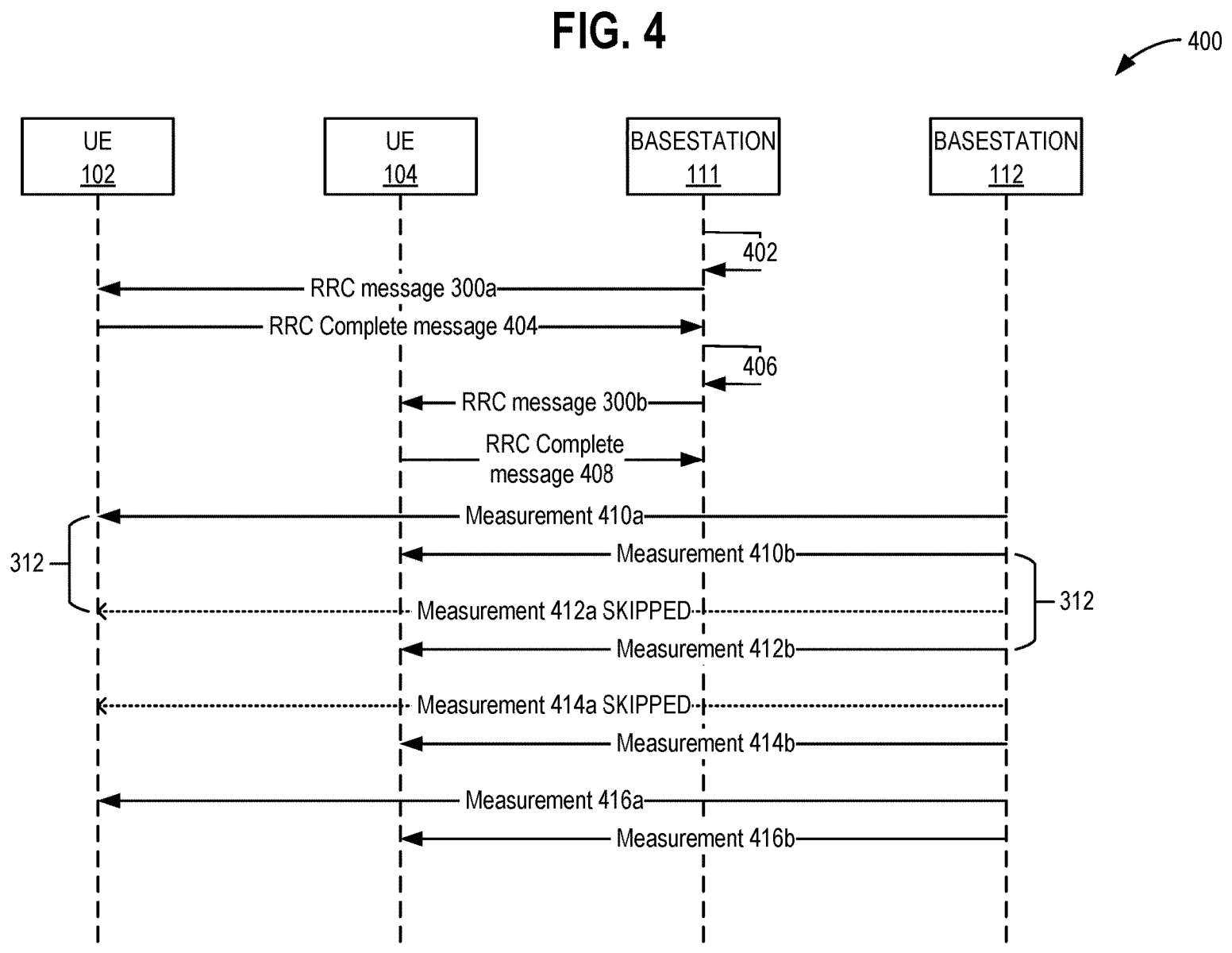

BASESTATION 112

BASESTATION 111

UE 104

UE 102

402

406

RRC message 300a

RRC Complete message 404

RRC message 300b

RRC Complete message 408

Measurement 410a

Measurement 410b

Measurement 412a SKIPPED

Measurement 412b

Measurement 414a SKIPPED

Measurement 414b

Measurement 416a

Measurement 416b

```
┌─────────────────────────────────────────────┐
│  DETERMINE, BY A WIRELESS NETWORK, THAT  602 │
│  A FIRST USER EQUIPMENT (UE) IS ASSOCIATED   │
│  WITH A STATIONARY USE                       │
└─────────────────────────────────────────────┘
                      │
                      ▼
┌─────────────────────────────────────────────┐
│  DETERMINE, BY THE WIRELESS NETWORK, THAT A  604 │
│  SECOND UE IS NOT ASSOCIATED WITH THE STATIONARY USE │
└─────────────────────────────────────────────┘
                      │
                      ▼
┌─────────────────────────────────────────────┐
│  BASED ON AT LEAST DETERMINING THAT THE  606 │
│  FIRST UE IS ASSOCIATED WITH THE STATIONARY USE, │
│  TRANSMIT, TO THE FIRST UE, A FIRST RADIO RESOURCE │
│  CONTROL (RRC) MESSAGE SPECIFYING A MEASUREMENT │
│  GAP REPETITION PERIOD (MGRP) AND AN INDICATION TO │
│  SKIP AT LEAST ONE MEASUREMENT GAP           │
└─────────────────────────────────────────────┘
                      │
                      ▼
┌─────────────────────────────────────────────┐
│  BASED ON AT LEAST DETERMINING THAT THE  608 │
│  SECOND UE IS NOT ASSOCIATED WITH THE STATIONARY │
│  USE, TRANSMIT, TO THE SECOND UE, A SECOND RRC │
│  MESSAGE SPECIFYING THE MGRP AND NOT INCLUDING │
│  AN INDICATION TO SKIP A MEASUREMENT GAP     │
└─────────────────────────────────────────────┘
```

INTELLIGENT ADAPTIVE MEASUREMENT GAPS FOR LOW MOBILITY USER EQUIPMENT (UEs)

BACKGROUND

In a fifth generation (5G) and other wireless networks (e.g., cellular networks), a user equipment (UE) normally in connected mode needs to continue measuring signal reception from neighboring cells, such as intra-frequency, inter-frequency, and inter-radio access technology (RAT) cells, to ensure that it is connected to the best serving cell. To accomplish this, the UE is typically assigned a measurement gap to tune its radio to the target frequency. This is even needed for 5G intra-frequency cells, because the UE might be measuring a frequency outside of its active bandwidth parts (BWPs).

While the UE is tuning its radio to perform the measurements, it cannot simultaneously transmit to or receive from its serving cell. The time period when the UE is unable to transmit to or receive from its serving cell is called a measurement gap. Measurement gaps may have higher priority than data or even signaling transmission, which negatively impacts data throughput for the wireless network.

SUMMARY

The following summary is provided to illustrate examples disclosed herein, but is not meant to limit all examples to any particular configuration or sequence of operations.

Solutions are disclosed that provide intelligent adaptive measurement gaps for low mobility user equipment (UEs). Examples include: determining, by a wireless network, that a first UE is associated with a stationary use; determining, by the wireless network, that a second UE is not associated with the stationary use; based on at least determining that the first UE is associated with the stationary use, transmitting, to the first UE, a first radio resource control (RRC) message specifying a measurement gap repetition period (MGRP) and an indication to skip at least one measurement gap; and based on at least determining that the second UE is not associated with the stationary use, transmitting, to the second UE, a second RRC message specifying the MGRP and not including an indication to skip at least one measurement gap.

BRIEF DESCRIPTION OF THE DRAWINGS

The disclosed examples are described below with reference to the accompanying drawing figures listed below, wherein:

FIGS. 2A, 2B, and 2C illustrate timelines of measurement gaps, as may occur in the example architecture of FIG. 1;

FIG. 3 illustrates exemplary radio resource control (RRC) message content as may be used in the example architecture of FIG. 1;

FIG. 4 illustrates a message sequence diagram of messages that may be used in the example architecture of FIG. 1;

FIGS. 5 and 6 illustrate flowcharts of exemplary operations associated with the architecture of FIG. 1.

Figure 1:
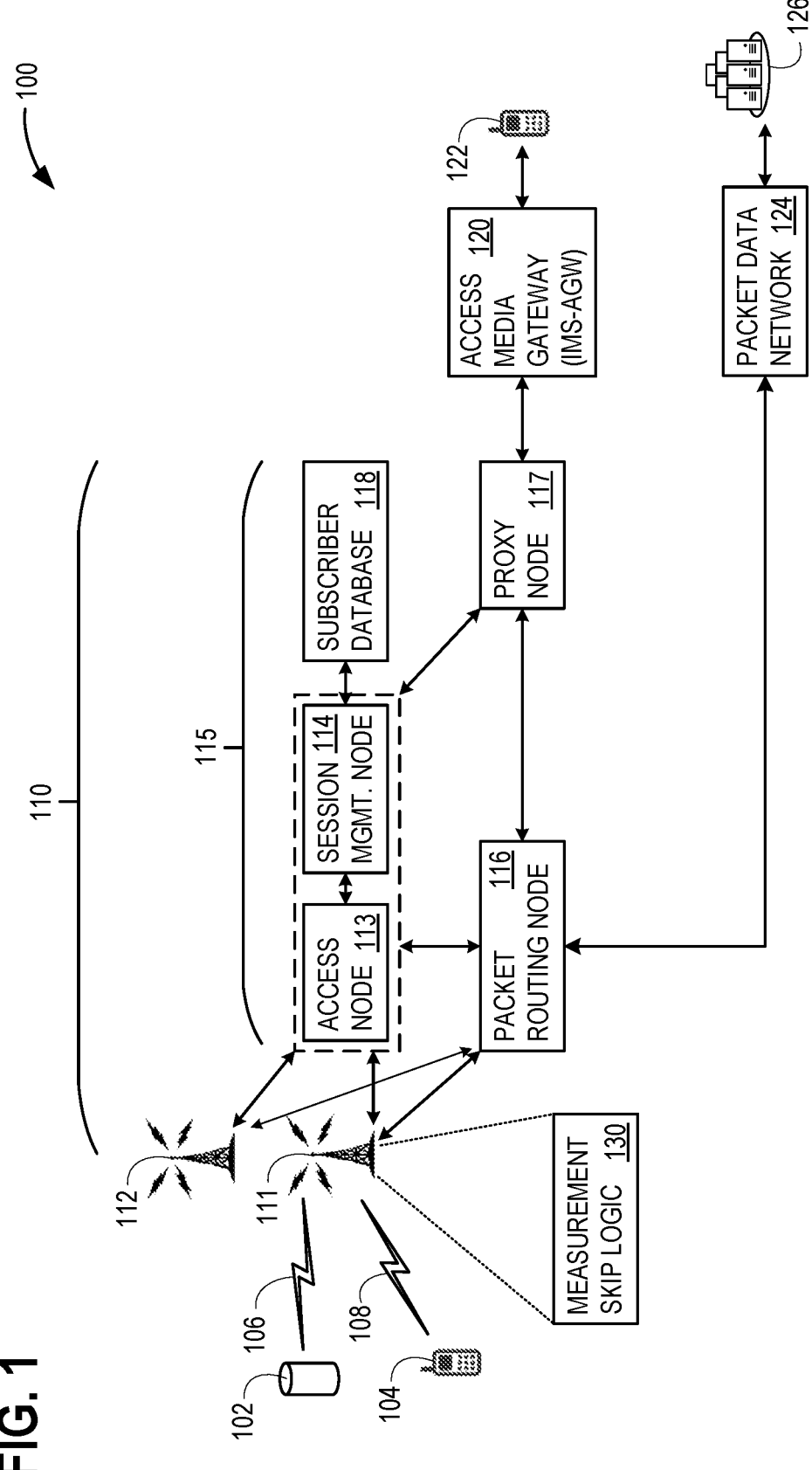
FIG. 1 illustrates an exemplary architecture that advantageously provides intelligent adaptive measurement gaps for low mobility user equipment (UEs)

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Solutions are disclosed that provide intelligent adaptive measurement gaps for low mobility user equipment (UEs), such as home internet access points. Because low mobility (stationary use) UE do not move, or move only infrequently, the frequency for of handovers (HOs) to neighboring cells is reduced, lowering the urgency of measuring signal reception from neighboring cells. A wireless network determines that a first UE is associated with a stationary use, and that a second UE is not. The network transmits a first radio resource control (RRC) message specifying a measurement gap repetition period (MGRP) and an indication to skip at least one measurement gap, to the first UE, and transmits a second RRC message specifying the MGRP, without an indication to skip a measurement gap, to the second UE. In some examples, the MGRP is indicated as having one of four values: 20 milliseconds (ms), 40 ms, 80 ms, and 160 ms.

In some examples, the indication to skip at least one measurement gap comprises an integer value and, with the integer value identified as N, the first UE skips all measurement gaps except one in a set of N or (N+1) consecutive MGRPs, or skips all measurement gaps except one in a set of $2^N$ consecutive MGRPs.

Aspects of the disclosure improve the efficiency of cellular networks without negatively impacting reliability, by reducing measurement gaps that interfere with network throughput. The result is that, with improved efficiency, UE battery life is extended, and the wireless network is able to carry a given amount of traffic within a shorter period of time. These advantageous results are accomplished, at least in part by, based on at least determining that a UE is associated with the stationary use, transmitting, to the UE, an RRC message specifying an MGRP and an indication to skip at least one measurement gap.

With reference now to the figures, FIG. 1 illustrates an exemplary architecture 100 that advantageously provides intelligent adaptive measurement gaps for low mobility UEs. A wireless network 110 is illustrated that is serving two UEs: a UE 102 and a UE 104. UE 102 is a low mobility UE associated with a stationary use, such as a home (or other facility) internet access point. An example may be a WiFi router that reaches the internet using cellular network (e.g., wireless network 110). In contrast, UE 104 is not a low mobility UE, because it is not associated with a stationary use. For example, UE 104 may be a cellular telephone—even a cellular telephone that provides a mobile internet access hotspot. Stationary use does not include a mobile internet access hotspot provided by a cellular telephone, because the dominant use cases for cellular telephones include a high degree of mobility.

In the scene depicted in FIG. 1, UE 102 is using wireless network 110 for a packet data session to reach a network resource 126 (e.g., a website) across an external packet data network 124 (e.g., the internet). UE 104 is using wireless network 110 for a phone call with another UE 122. Wireless network 110 may be a cellular network such as a fifth generation (5G) network, a fourth generation (4G) network, or another cellular generation network.

UE 102 uses an air interface 106 to communicate with base station 111 of wireless network 110, and UE 104 uses an air interface 108 to communicate with base station 111. A base station 112 is a neighboring base station of base station 111. UE 102 and UE 104 are able to receive and measure signals from base station 112, but base station 111 is the serving base station (providing the serving cell). Base station 111 and base station 112 may be physically separated, or may be co-located and providing cells at different frequencies.

In some scenarios, base station 111 and base station 112 may each also be referred to as a radio access network (RAN). Wireless network 110 has a core network 115 comprising an access node 113, a session management node 114, a subscriber database node 118, and other components (not shown). Wireless network 110 also has a packet routing node 116 and a proxy node 117. Access node 113 and session management node 114 are within a control plane of wireless network 110, and packet routing node 116 is within a user plane of wireless network 110).

Base station 111 and base station 112 are each in communication with access node 113 and packet routing node 116. Access node 113 is in communication with session management node 114 which is in communication with subscriber database node 118. Packet routing node 116 is in communication with session management node 114, proxy node 117, and packet data network 124. In some 5G examples, base stations 111 and 112 each comprises a gNodeB (gNB), access node 113 comprises an access mobility function (AMF), session management node 114 comprises a session management function (SMF), subscriber database node 118 comprises a unified data management (UDM) node, and packet routing node 116 comprises a user plane function (UPF).

In some 4G examples, base station 111 comprises an eNodeB (eNB), access node 113 comprises a mobility management entity (MME), session management node 114 comprises a system architecture evolution gateway (SAEGW) control plane (SAEGW-C), subscriber database node 118 comprises a home subscriber service (HSS) node, and packet routing node 116 comprises an SAEGW-user plane (SAEGW-U). In some examples, proxy node 117 comprises a proxy call session control function (P-CSCF) in both 4G and 5G.

In some examples, wireless network 110 has multiple ones of each of the components illustrated, in addition to other components and other connectivity among the illustrated components. In some examples, wireless network 110 has components of multiple cellular technologies operating in parallel in order to provide service to UEs of different cellular generations. For example, base stations 111 and 112 may each comprise a gNB or eNB, and may use different access nodes. In some examples, multiple cells may be co-located at a common cell site, and may be a mix of 5G and 4G.

Proxy node 117 is in communication with an internet protocol (IP) multimedia system (IMS) access gateway (IMS-AGW) 120 within an IMS, in order to provide connectivity to other wireless (cellular) networks, such as for a call with UE 122 or a public switched telephone system (PSTN, also known as plain old telephone system, POTS). In some examples, proxy node 117 may be considered to be within the IMS. UE 102 reaches network resource 126 using packet data network 124 or IMS-AGW 120, in some examples. Data packets from UE 102 pass through at least base station 111 and packet routing node 116 on their way to packet data network 124 or IMS-AGW 120 (via proxy node 117).

Subscriber database node 118, or some other node in wireless network 110 has information regarding whether UE 102 is associated with a stationary use and whether UE 104 is associated with a stationary use. For example, subscriber database node 118 may identify UE 102 as a particular model of a WiFi-capable home internet access point and may also identify UE 104 as a particular model of a cellular telephone. Such information regarding a UE model may be used to infer stationary use (low mobility use) or instead infer assumed high mobility use. Stationary use UEs may be mobile, such as a home internet access point is small enough to be hand-carried from one building to another, but the dominant use case is for the UE to remain in a fixed location with infrequent moves. In contrast cellular telephones are associated with being carried on a person who moves sufficient distances to require relatively frequent handovers to different cells.

Typically, a handover begins with a measurement report for a measurement of a neighboring cell during a measurement gap. The measurement report may include a mobility event such as an Event A3 (i.e., a neighbor cell is better than the serving cell by an offset), or an Event A2 (i.e., the serving cell signal falls below a threshold). Wireless network 110 then instructs the UE to move from one cell to another cell, either at the same frequency layer or a different frequency layer, with an HO command. The HO command normally comes to the UE through an RRCReconfiguration message that contains the radio parameters the UE needs to connect to the target cell (i.e., the new cell to which the UE is being handed over).

Measurement gaps are illustrated in FIGS. 2A-2C, below. A measurement gap creates a small gap in normal UE to base station data traffic during which no transmission and reception occurs, so that the UE is able to tune its radio to a neighbor cell frequency and perform a signal quality measurement of the signal received from the neighbor cell.

Wireless network 110 has measurement gap logic 130, shown within base station 111, but which may be located elsewhere (including distributed among multiple nodes of wireless network 110). Measurement gap logic 130 instructs UEs 102 and 104 regarding measurement gaps using RRC signals. The instructions include a selected MGRP and a selected measurement gap length (MGL). Wireless network 110 has data on network topology in the vicinity of base station 111, as well as handoff histories of other UEs previously served by base station 111, and so is able to estimate the time that UEs need for measuring neighboring base stations. That is, wireless network 110 knows whether a UE will need more or less time to tune its radio to measure signal quality of neighboring base stations, because wireless network knows the operating frequencies of base station 111 and neighboring base station 112. Measurement gap logic 130 also determines when low mobility UEs (e.g., UEs associated with a stationary use) are able to skip measurements of the signal quality of neighboring base stations, and how many measurements should be skipped.

FIG. 2A illustrates a timeline 200*a* of measurement gaps, including a measurement gap 202*a* and a measurement gap 202*b*. In timeline 200*a*, measurement gaps (e.g., measurement gaps 202*a* and 202*b*) repeat on a period shown by a MGRP 312, which is also shown in FIG. 3 and described in further detail below. Each of measurement gaps 202*a* and 202*b* lasts for a duration of measurement gap length (MGL) 310, which is also shown in FIG. 3 and described in further detail below.

FIG. 2B illustrates a timeline 200*b*, which is a close-up view of measurement gap 202*a*. Measurement gap 202*b* and other measurement gaps are similar. Measurement gap 202*a* begins with a retune time 204*a*, which is followed by a measurements period 206, at which time the UE (e.g., UE 102 or UE 104) is able to perform signal quality measurements of neighboring base stations, such as neighboring base station 112. The signal quality measurements may be performed on synchronization signal blocks (SSBs) of neighboring base stations in 5G. As illustrated a measurement is performed on an SSB 208*a* of base station 112, and another measurement is performed on an SSB 208*b* of another neighboring base station (if any). After measurements period 206, another retune time 204*b* is needed before the UE can go back to transmitting to and receiving from serving base station 111.

FIG. 2C illustrates a timeline 200*c*, in which measurement gap 202*a* is used for measurements, measurement gap 202*b* is skipped, and measurements resume in a measurement gap 202*c*. In general the network throughput efficiency improvement is given by:

$$\text{Improvement}(\%) = \frac{N \times MGL}{(N+1) \times (MGRP)} \times 100\% \qquad \text{Eq. (1)}$$

where N is the number of measurement gaps that are skipped.

As an example, for an MGRP of 40 milliseconds (ms) and an MGL of 6 ms, skipping one measurement gap (out of every 2 consecutive measurement gaps or MGRPs), has N=1 and Eq. (1) solves to a fraction of 6/80, which is 7.5%. Skipping two measurement gaps (out of every 3 consecutive measurement gaps), has N=2 and Eq. (1) solves to a fraction of 12/120, which is 10%. As expected, the higher number of measurement gaps that are skipped, the higher the resulting network throughput efficiency improvement is.

FIG. 3 illustrates an exemplary RRC message 300 in the form of an RRCReconfiguration message as specified by pseudocode in European Telecommunications Standards Institute (ETSI) technical standard (TS) 138 331 section 6.2.2 Message Definitions and section 6.3.2 Radio Resource Control Information Elements. ETSI TS 138 331 has a corresponding Third Generation Partnership Project (3GPP) TS 38.331. A new element has been added to the TS specifications, as noted below.

RRC message 300 has a MeasConfig information element 302 that is introduced by a MeasConfig type declaration 302*a* and contains MeasConfig content 302*b*. MeasConfig content 302*b* has a MeasGapConfig information element 304 that is introduced by a MeasGapConfig type declaration 304*a* and contains MeasGapConfig content 304*b*. MeasGapConfig content 304*b* contains a GapConfig information element 306 that has GapConfig content 306*a*.

GapConfig content 306*a* has a gapOffset 308, MGL 310, MGRP 312, and a measurement gap timing advance (MGTA) 314. The value of gapOffset 308 points to the starting subframe when a measurement gap should occur. MGTA 314 is optional in some examples. The value of MGL 310 specifies the length of a measurement gap in milliseconds, and is currently constrained to take on only a limited set of possible values: 1.5 ms, 3.0 ms, 3.5 ms, 4.0 ms, 5.5 ms, and 6 ms. The value of MGRP 312 specifies the repetition period of a measurement gap in milliseconds, and is also currently constrained to take on only a limited set of possible values: 20 ms, 40 ms, 80 ms, and 160 ms.

The relevant TSs, with which cellular base station and user equipment providers strive to remain compatible, does not allow extending MGRP 312 beyond 160 ms. This limitation may remain intact, because the time specification for MGRP 312 can be set using only 2 data bits. A set of 2 bits may represent up to 4 different values. Extending MGRP 312 requires the use of 3 bits, which may be a challenging to implement.

As a result, a new information element, indication 316 (shown in bold italic as "gapSkip INTEGER (0 . . . . N)" is added to GapConfig content 306*a*. This is in indication to skip one or more measurement gaps, and enables extending MGRP 312 beyond 160 ms. For example, specifying MGRP 312 as 160 ms, but with one measurement gap to be skipped (out of every 2 consecutive measurement gaps) extends the actual measurement gap repetition period to 320 ms. Other values are also possible, using various combinations of the possible values for MGRP 312 (20 ms, 40 ms, 80 ms, and 160 ms), and various skip values.

The behavior of UE 102, when it receives and interprets indication 316 may be specified separately. For example, if indication 316 is an integer N, then N may indicate that all measurement gaps, except one in a set of N or (N+1) consecutive MGRPs 312 is to be skipped. For example, if the rule is that all measurement gaps, except one in a set of N consecutive MGRPs 312 is to be skipped, then setting N=2 results in skipping every second measurement gap, and setting N=0 indicates that no measurement gaps are to be skipped. Similarly, if the rule is that all measurement gaps, except one in a set of (N+1) consecutive MGRPs 312 is to be skipped, then setting N=1 results in skipping every second measurement gap, and setting N=0 indicates that no measurement gaps are to be skipped.

Other schemes are also possible, such as:

$$\text{Number to skip, } M = 2^N - 1 \qquad \text{Eq. (2)}$$

where N is provided in indication 316, and M is the number of measurement gaps that are skipped for a set of (M+1) consecutive MGRPs 312. With this scheme, setting N=0 results in no measurement gaps being skipped (RRC message 300 does not include an indication to skip a measurement gap), setting N=1 results in skipping every second measurement gap, setting N=2 results in skipping 3 out of every 4 consecutive measurement gaps, and setting N=3 results in skipping 7 out of every 8 consecutive measurement gaps. In some examples, omitting indication 316 entirely is another way that RRC message 300 does not include an indication to skip a measurement gap.

FIG. 4 illustrates a message sequence diagram 400 of messages that may be used in architecture 100. In operation 402, base station 111 (or another node of wireless network 110) determines that UE 102 is associated with a stationary use. Base station 111 transmits RRC message 300*a* to UE 102, including MGRP 312 and indication 316 to skip at least one measurement gap. RRC message 300*a* is an example of RRC message 300 of FIG. 3. UE 102 responds with an RRCReconfigurationComplete message 404. In this example, UE 102 is instructed to skip 2 out of every 3 consecutive measurement gaps.

In operation 406, base station 111 (or another node of wireless network 110) determines that UE 104 is not associated with a stationary use. Base station 111 transmits RRC message 300*b* to UE 104, including MGRP 312 and but with no indication to skip a measurement gap. RRC message 300*b* is an example of RRC message 300 of FIG. 3. The no indication to skip a measurement gap may be signaled by omitting indication 316 entirely, or by setting it to a value of zero. UE 104 responds with an RRCReconfigurationComplete message 408.

UE 102 performs a measurement 410*a*, and UE 104 performs a measurement 410*b* at approximately the same time (i.e., likely within the time period specified by MGRP 312). At a later time (determined by MGRP 312), UE 102 skips a measurement 412*a*, but UE 104 performs a measurement 412*b*. Again, at a later time (determined by MGRP 312), UE 102 skips a measurement 414*a*, but UE 104 performs a measurement 414*b*. UE 102 has now skipped 2 measurement gaps, and so resumes making measurements. At a yet later time (determined by MGRP 312), UE 102 performs a measurement 416*a*, and UE 104 performs a measurement 416*b*. UE 102 then returns to skipping the next measurement gap.

Figure 5:
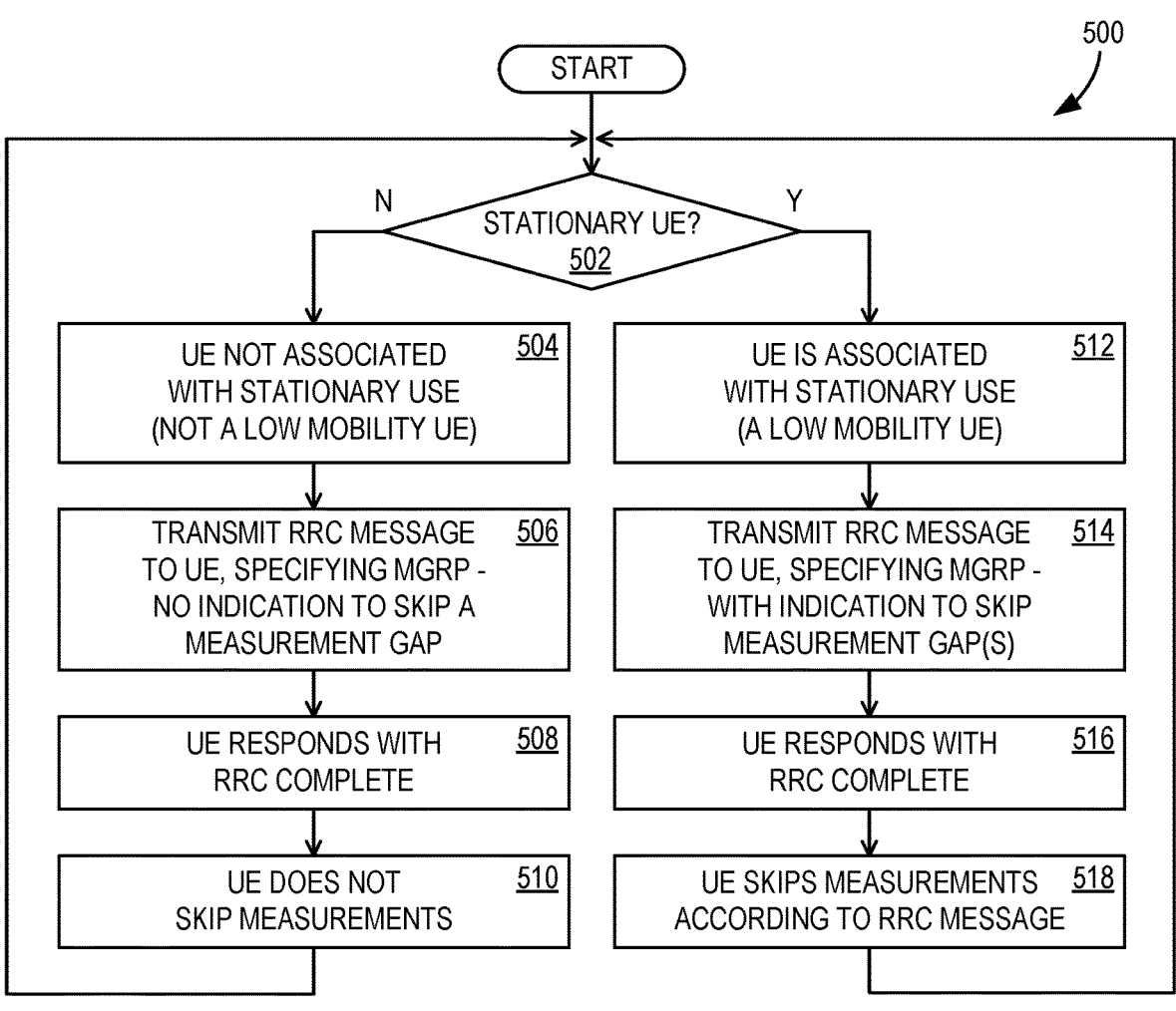

FIG. 5 illustrates a flowchart 500 of exemplary operations associated with examples of architecture 100. In some examples, at least a portion of flowchart 500 may be performed using one or more computing devices 700 of FIG. 7. Flowchart 500 commences with wireless network 110 determining whether a UE being served by base station 111 is associated with a stationary use, in decision operation 502. Stationary use (or low mobility use) includes facility internet access, such as a home internet access point (e.g., WiFi router), but does not include a mobile internet access hotspot, such as those provided by cellular telephones. The No decision branch of decision operation 502 is described first.

Wireless network 110 has determined that UE 104 is not associated with a stationary use, as indicated in box 504. In some examples, UE 104 comprises a cellular telephone. In operation 506, wireless network 110 transmits RRC message 300*b* to UE 104, based on at least determining that UE 104 is not associated with a stationary use.

RRC message 300*b* specifies MGRP 312, but does not include indication 316 to skip a measurement gap. In some examples, this is accomplished by including the field for indication 316, but setting the value (N) to zero. In some examples, RRC message 300*b* comprises an example of the RRCReconfiguration message of FIG. 3. MGRP 312 is within MeasGapConfig information element 304 of RRC message 300*b*, and MeasGapConfig information element 304 of RRC message 300*b* is within MeasConfig information element 302 of RRC message 300*b*. In some examples, MGRP 312 is indicated as having a value selected from among the four values: 20 ms, 40 ms, 80 ms, and 160 ms.

UE 104 responds by transmitting RRCReconfigurationComplete message 408 in operation 508, based on at least receiving RRC message 300*b*. In operation 510, UE 104 complies with RRC message 300*b* and does not skip any measurement gaps.

Returning to decision operation 502 of flowchart 500, the Yes branch is now described. Wireless network 110 has determined that UE 102 is associated with a stationary use, as indicated in box 512. In some examples, UE 102 comprises an internet access point (e.g., a home internet access point, such as a WiFi router). In operation 514, wireless network 110 transmits RRC message 300*a* to UE 102, based on at least determining that UE 102 is associated with a stationary use.

RRC message 300*a* specifies MGRP 312 and includes indication 316 to skip at least one measurement gap. In some examples, this is accomplished by setting a value for indication 316 to a non-zero integer. In some examples, RRC message 300*a* comprises an example of the RRCReconfiguration message of FIG. 3. MGRP 312 is within MeasGapConfig information element 304 of RRC message 300*a*, and MeasGapConfig information element 304 of RRC message 300*a* is within MeasConfig information element 302 of RRC message 300*a*. In some examples, RRC message 300*a* has the same MGRP 312 as RRC message 300*b*. In some examples, indication 316 is within MeasGapConfig information element 304 of RRC message 300*a*.

UE 102 responds by transmitting RRCReconfigurationComplete message 404 in operation 516, based on at least receiving RRC message 300*a*. In operation 518, UE 102 complies with RRC message 300*a* and skips measurement gaps as instructed. For example, with the integer value of indication 316 identified as N, UE 102 skips all measurement gaps except one in a set of N or (N+1) consecutive MGRPs. In some examples, UE 102 skips all measurement gaps except one in a set of 2^N consecutive MGRPs.

FIG. 6 illustrates a flowchart 600 of exemplary operations associated with examples of architecture 100. In some examples, at least a portion of flowchart 600 may be performed using one or more computing devices 700 of FIG. 7. Flowchart 600 commences with operation 602, which includes determining, by a wireless network, that a first UE is associated with a stationary use.

Operation 604 includes determining, by the wireless network, that a second UE is not associated with the stationary use. Operation 606 includes, based on at least determining that the first UE is associated with the stationary use, transmitting, to the first UE, a first RRC message specifying an MGRP and an indication to skip at least one measurement gap. Operation 608 includes, based on at least determining that the second UE is not associated with the stationary use, transmitting, to the second UE, a second RRC message specifying the MGRP and not including an indication to skip a measurement gap.

Figure 7:
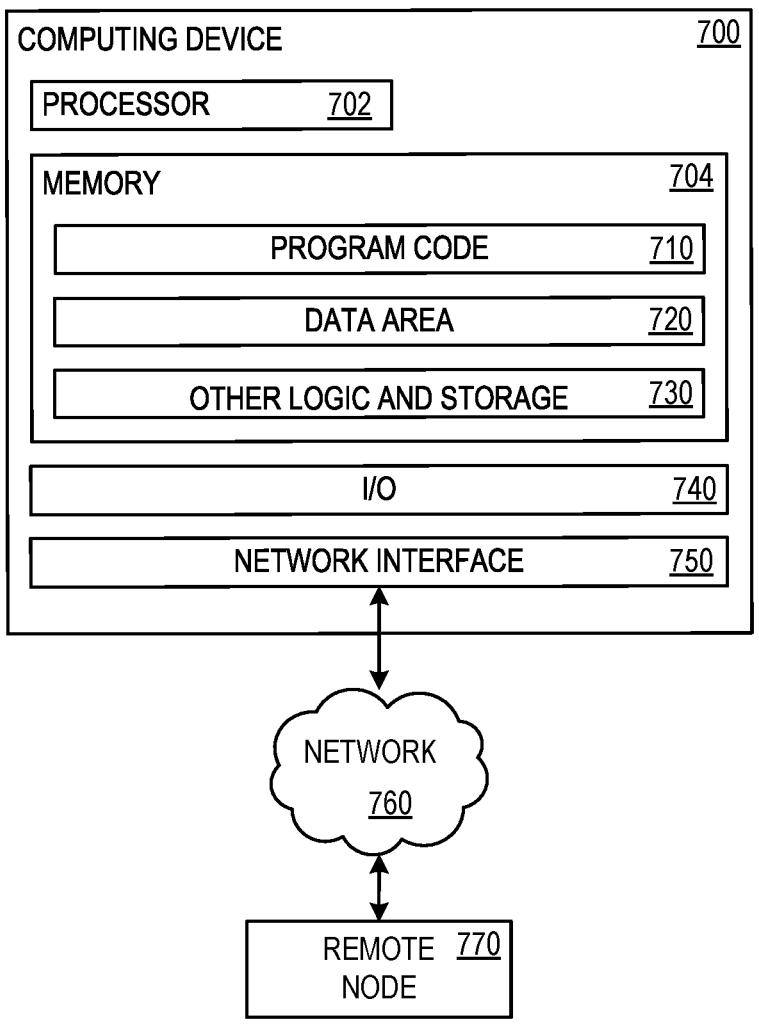
FIG. 7 illustrates a block diagram of a computing device suitable for implementing various aspects of the disclosure.

FIG. 7 illustrates a block diagram of computing device 700 that may be used as any component described herein that may require computational or storage capacity. Computing device 700 has at least a processor 702 and a memory 704 that holds program code 710, data area 720, and other logic and storage 730. Memory 704 is any device allowing information, such as computer executable instructions and/ or other data, to be stored and retrieved. For example, memory 704 may include one or more random access memory (RAM) modules, flash memory modules, hard disks, solid-state disks, persistent memory devices, and/or optical disks. Program code 710 comprises computer executable instructions and computer executable components including instructions used to perform operations described herein. Data area 720 holds data used to perform operations described herein. Memory 704 also includes other logic and storage 730 that performs or facilitates other functions disclosed herein or otherwise required of computing device 700. An input/output (I/O) component 740 facilitates receiving input from users and other devices and generating displays for users and outputs for other devices. A network interface 750 permits communication over external network 760 with a remote node 770, which may represent another implementation of computing device 700. For example, a remote node 770 may represent another of the above-noted nodes within architecture 100.

Additional Examples

An example system comprises: a processor; and a computer-readable medium storing instructions that are operative upon execution by the processor to: determine, by a wireless network, that a first UE is associated with a stationary use; determine, by the wireless network, that a second UE is not associated with the stationary use; based on at least determining that the first UE is associated with the stationary use, transmit, to the first UE, a first RRC message specifying an MGRP and an indication to skip at least one measurement gap; and based on at least determining that the second UE is not associated with the stationary use, transmit, to the second UE, a second RRC message specifying the MGRP and not including an indication to skip a measurement gap.

An example method of wireless communication comprises: determining, by a wireless network, that a first UE is associated with a stationary use; determining, by the wireless network, that a second UE is not associated with the stationary use; based on at least determining that the first UE is associated with the stationary use, transmitting, to the first UE, a first RRC message specifying an MGRP and an indication to skip at least one measurement gap; and based on at least determining that the second UE is not associated with the stationary use, transmitting, to the second UE, a second RRC message specifying the MGRP and not including an indication to skip a measurement gap.

One or more example computer storage devices has computer-executable instructions stored thereon, which, upon execution by a computer, cause the computer to perform operations comprising: determining, by a wireless network, that a first UE is associated with a stationary use; determining, by the wireless network, that a second UE is not associated with the stationary use; based on at least determining that the first UE is associated with the stationary use, transmitting, to the first UE, a first RRC message specifying an MGRP and an indication to skip at least one measurement gap, wherein the first RRC message comprises a first RRCReconfiguration message, wherein the MGRP is within a MeasGapConfig information element of the first RRCReconfiguration message, wherein the indication to skip at least one measurement gap is within the MeasGapConfig information element of the first RRC message, wherein the indication to skip at least one measurement gap comprises an integer value, and wherein the MGRP is indicated as having a value selected from the list consisting of: 20 ms, 40 ms, 80 ms, and 160 ms; and based on at least determining that the second UE is not associated with the stationary use, transmitting, to the second UE, a second RRCReconfiguration message specifying the MGRP and not including an indication to skip a measurement gap.

Alternatively, or in addition to the other examples described herein, examples include any combination of the following:

the first UE comprises an internet access point;
the second UE comprises a cellular telephone;
the stationary use includes facility internet access;
the stationary use does not include a mobile internet access hotspot;
the first RRC message comprises an RRCReconfiguration message;
the second RRC message comprises an RRCReconfiguration message;
the MGRP is within a MeasGapConfig information element of each RRCReconfiguration message;
the MeasGapConfig information element of each RRCReconfiguration message is within a MeasConfig information element of each RRCReconfiguration message;

the indication to skip at least one measurement gap is within the MeasGapConfig information element of the first RRC message;
the indication to skip at least one measurement gap comprises an integer value;
with the integer value identified as N, the first UE skips all measurement gaps except one in a set of N or (N+1) consecutive MGRPs;
with the integer value identified as N, the first UE skips all measurement gaps except one in a set of 2^N consecutive MGRPs;
the MGRP is indicated as having a value selected from the list consisting of: 20 ms, 40 ms, 80 ms, and 160 ms; and
based on at least receiving the first RRC message, transmitting by the first UE, an RRCReconfigurationComplete message.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of wireless communication, the method comprising:

determining, by a wireless network, that a first user equipment (UE) is associated with a stationary use;

determining, by the wireless network, that a second UE is not associated with the stationary use;

based on at least determining that the first UE is associated with the stationary use, transmitting, to the first UE, a first radio resource control (RRC) message specifying a measurement gap repetition period (MGRP) and an indication to skip at least one measurement gap, wherein the indication to skip at least one measurement gap comprises an integer value and wherein, with the integer value identified as N, the first UE either:

skips all measurement gaps except one in a set of N or (N+1) consecutive MGRPs; or skips all measurement gaps except one in a set of 2N consecutive MGRPs; and based on at least determining that the second UE is not associated with the stationary use, transmitting, to the second UE, a second RRC message specifying the MGRP and not including an indication to skip a measurement gap.

2. The method of claim 1, wherein the first UE comprises an internet access point and/or the stationary use includes facility internet access.

3. The method of claim 1, wherein the first RRC message and the second RRC message each comprises an RRCReconfiguration message, and wherein the MGRP is within a MeasGapConfig information element of each RRCReconfiguration message.

4. The method of claim 3, wherein the indication to skip at least one measurement gap is within the MeasGapConfig information element of the first RRC message.

5. The method of claim 1, wherein the MGRP is indicated as having a value selected from the list consisting of:

20 milliseconds (ms), 40 ms, 80 ms, and 160 ms.

6. A system comprising:

a processor; and a computer-readable medium storing instructions that are operative upon execution by the processor to:

determine, by a wireless network, that a first user equipment (UE) is associated with a stationary use;

determine, by the wireless network, that a second UE is not associated with the stationary use;

based on at least determining that the first UE is associated with the stationary use, transmit, to the first UE, a first radio resource control (RRC) message specifying a measurement gap repetition period (MGRP) and an indication to skip at least one measurement gap, wherein the indication to skip at least one measurement gap comprises an integer value and wherein, with the integer value identified as N, the first UE either:

skips all measurement gaps except one in a set of N or (N+1) consecutive MGRPs; or skips all measurement gaps except one in a set of 2N consecutive MGRPs; and based on at least determining that the second UE is not associated with the stationary use, transmit, to the second UE, a second RRC message specifying the MGRP and not including an indication to skip a measurement gap.

7. The system of claim 6, wherein the first UE comprises an internet access point and/or the stationary use includes facility internet access.

8. The system of claim 6, wherein the first RRC message and the second RRC message each comprises an RRCReconfiguration message, and wherein the MGRP is within a MeasGapConfig information element of each RRCReconfiguration message.

9. The system of claim 8, wherein the indication to skip at least one measurement gap is within the MeasGapConfig information element of the first RRC message.

10. The system of claim 6, wherein the MGRP is indicated as having a value selected from the list consisting of:

20 milliseconds (ms), 40 ms, 80 ms, and 160 ms.

11. One or more computer storage devices having computer-executable instructions stored thereon, which, upon execution by a computer, cause the computer to perform operations comprising:

determining, by a wireless network, that a first user equipment (UE) is associated with a stationary use;

determining, by the wireless network, that a second UE is not associated with the stationary use;

based on at least determining that the first UE is associated with the stationary use, transmitting, to the first UE, a first radio resource control (RRC) message specifying a measurement gap repetition period (MGRP) and an indication to skip at least one measurement gap, wherein the first RRC message comprises a first RRCReconfiguration message, wherein the MGRP is within a MeasGapConfig information element of the first RRCReconfiguration message, wherein the indication to skip at least one measurement gap is within the MeasGapConfig information element of the first RRC message, wherein the indication to skip at least one measurement gap comprises an integer value, wherein, with the integer value identified as N, the first UE either:

skips all measurement gaps except one in a set of N or (N+1) consecutive MGRPs; or skips all measurement gaps except one in a set of $2^N$ consecutive MGRPs, and wherein the MGRP is indicated as having a value selected from the list consisting of:

20 milliseconds (ms), 40 ms, 80 ms, and 160 ms; and based on at least determining that the second UE is not associated with the stationary use, transmitting, to the second UE, a second RRCReconfiguration message specifying the MGRP and not including an indication to skip a measurement gap.

12. The one or more computer storage devices of claim 11, wherein the first UE comprises an internet access point;

wherein the second UE comprises a cellular telephone;

the stationary use includes facility internet access; and wherein the stationary use includes does not include a mobile internet access hotspot.

13. The one or more computer storage devices of claim 11, wherein the MeasGapConfig information element of the first RRCReconfiguration message is within a MeasConfig information element of the first RRCReconfiguration message.

* * * * *